Patented Sept. 9, 1952

2,610,159

UNITED STATES PATENT OFFICE 2,610,159

METHOD FOR THE PRODUCTION OF SYNTHETIC COMPOSITIONS UTILIZING HORN MEAL OR NEAT'S-FOOT MEAL

Rudolf Květoň, Strelske Hostice, Czechoslovakia

No Drawing. Application May 2, 1950, Serial No. 159,652. In Czechoslovakia November 15, 1949

2 Claims. (Cl. 260—6)

This invention relates to synthetic compositions and particularly keratin containing synthetic molding compositions.

In the hitherto customary methods for the manufacture of these compositions primary amino or amido condensation products and horn meal are used. These compositions, however, contain a small number only of intermolecular bridge linkages between the condensation products and the active components of the keratin molecule; the consequences are unsatisfactory physical and chemical properties of the synthetic compositions.

It is the main object of this invention to produce synthetic compositions of the above mentioned type which possess in their molecular structure a surprisingly large amount of bridge linkages between the true condensation products and the active components of the keratin molecule.

With this object in view, horn or neat's-foot meal or mixtures thereof are admixed to an alkalized 10 to 40 per cent formaldehyde or other aldehydes containing aqueous solution and allowed to swell; the formaldehyde solution should be preferably heated to about 40 to 80° C. whereby the melting time may be greatly reduced; the pH of the aldehyde solution is adjusted to 7.5 to 10.0; the solution is admixed to urea, melamine or mixtures thereof with other amines or amides such as thiourea, dicyandiamide, guanidine, aniline and the like; catalyzers, hardening materials and dye-stuffs may be added.

The mixture is kneaded and an operating temperature should be maintained beneath 90° C.

During the first period of the operation of about one hour the pH is maintained at about 7.0; it is then allowed to drop until at the end of the process a pH is reached of 3.5 to 6.3. The entire working time is approximately 2 to 4 hours.

The chemical characteristics are as follows.

By the action of the aqueous aldehyde and particularly formaldehyde solution onto the albumin of the initial substances methylol groups are formed and added to the already present amino and amido groups; these methylol groups react with the imino groups of the urea and melamine or the intermediary condensation products also converted into methylol compounds the methylol compounds of these intermediary products entering into a reaction with the imino groups of the keratin.

Numerous methylene bridges and bonds are formed in this manner between the keratin molecules and the amino or amido condensates whereby both components are bound together by main valences; therefore this procedure cannot be denoted as a filler action.

The invention will now be described more in detail by the following examples.

Example 1

160 parts of a 30 per cent formaldehyde solution are alkalised with borax to a pH=9.0, heated to 60° C. and mixed in the kneading machine with 120 parts of horn meal. During the slow kneading for 1 to 4 hours the temperature is held at 60° C. After the pH has reached an adjustment to about 8, 60 parts of urea are added. After further kneading of 2 hours the pH is adjusted to between 4 to 5 and the mass dried.

Example 2

300 parts of a 10 per cent formaldehyde solution are neutralized with soda lye to a pH equal to 8 and mixed in the kneading machine with 100 parts of horn meal over 6 hours at room temperature. Thereupon 15 parts of urea, 5 parts thiourea and 0.5 part ammonium chloride are added and kneaded at a pH equal to 8 over 2 hours. Before drying the pH is adjusted to about 4.

Example 3

360 parts of a 40 per cent formaldehyde solution are alkalized with borax to a pH equal to 7.6, heated to 60° C. and mixed in the kneading machine with 250 parts of neat's-foot meal. After kneading for one or two hours 95 parts of melamine and 1 part of ammonium sulphate are added and mixed for 3 hours without additional heating. Before drying the pH is adjusted to about 4.5.

Since certain changes in carrying out the above process could be made without departing from the scope thereof, it is intended that all matter contained in the above description shall be interpreted as illustrative and not in a limiting sense.

I claim:

1. In a method for the production of synthetic molding compositions having a large number of intermolecular bridge linkages, the steps comprising admixing 120 parts by weight of horn meal to 160 parts by weight of a 30 per cent alkaline formaldehyde solution having a pH equal to 9.0, kneading the mixture for one to four hours at a temperature of 60° C., adding 60 parts by weight of urea as soon as a pH equal to 8 has been reached, continuing kneading the mixture for two hours whereby the pH is adjusted to between 4.0 to 5.0, and drying the mixture.

2. In a method for the production of synthetic molding compositions having a large number of intermolecular bridge linkages, the steps comprising admixing about 100 to 250 parts by weight of a substance selected from a group consisting of horn meal, neat's-foot meal, and mixtures thereof to about 160 to 360 parts by weight of a 10 to 40 per cent alkaline formaldehyde solution having a pH equal to from 7.5 to 10.0, kneading the mixture with about 20 to 100 parts of a substance selected from the group consisting of urea, melamine and mixtures thereof with a substance selected from the group consisting of thiourea, dicyandiamide, guanidine, and aniline while lowering the pH during the reaction to a pH equal to from 3.5 to 6.3, and drying the mixture.

RUDOLF KVĚTOŇ.

REFERENCES CITED

The following references are of record in the file of this patent:

UNITED STATES PATENTS

| Number | Name | Date |
|---|---|---|
| 2,125,776 | Ellis | Aug. 2, 1938 |
| 2,256,253 | Neuss | Sept. 16, 1941 |